May 15, 1928.
H. R. VAN DEVENTER
1,669,501
CONTROL MEANS FOR ELECTRIC COOKING DEVICES
Filed March 1, 1924   2 Sheets-Sheet 1
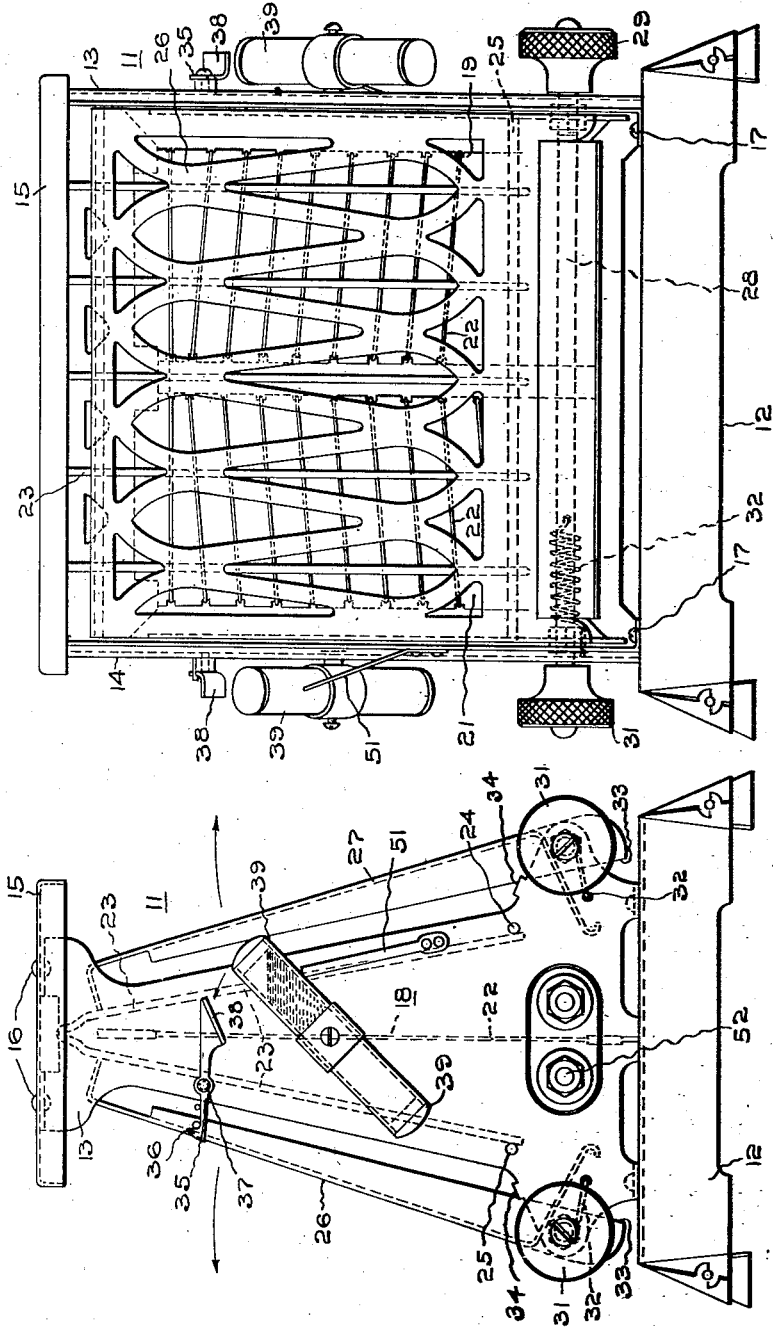
WITNESSES:
INVENTOR
Harry R. Van Deventer
BY
Wesley G. Carr
ATTORNEY May 15, 1928.
H. R. VAN DEVENTER
1,669,501
CONTROL MEANS FOR ELECTRIC COOKING DEVICES
Filed March 1, 1924 2 Sheets-Sheet 2
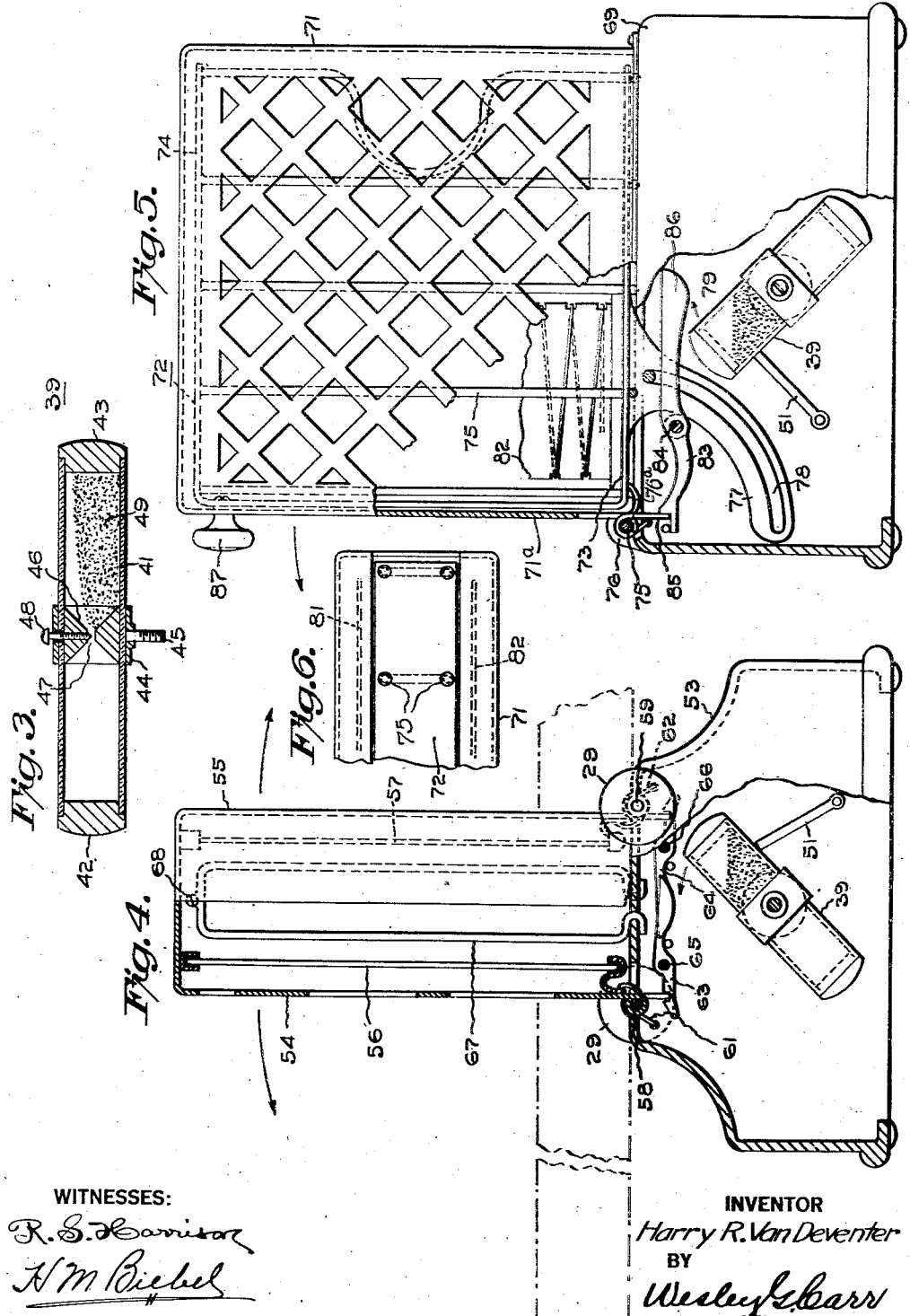
WITNESSES:
INVENTOR
Harry R. Van Deventer
BY
Wesley G. Carr
ATTORNEY Patented May 15, 1928.

1,669,501

UNITED STATES PATENT OFFICE.

HARRY R. VAN DEVENTER, OF NEW YORK, N. Y., ASSIGNOR TO WESTINGHOUSE ELECTRIC & MANUFACTURING COMPANY, A CORPORATION OF PENNSYLVANIA.

CONTROL MEANS FOR ELECTRIC COOKING DEVICES.

Application filed March 1, 1924. Serial No. 696,182.

My invention relates to cooking devices and particularly to toasters.

One object of my invention is to provide a table toaster with means for effecting disengagement between the material-supporting means and the heating element thereof after a predetermined length of time.

Another object of my invention is to provide a time-controlled means that will effect relative movement between the heating element and the material-supporting means at the end of a predetermined time whereby the toasting operation is determined without interrupting the operation of the heating element itself.

Another object of my invention is to provide a time-controlled dynamic-thrust means for effecting the change in the relative positions of the parts.

It is impossible, in the operation of electric table toasters, for the operator to observe directly the progress of the toasting operation and if his attention should be directed to something else for a short period of time, it is possible that the slice of bread may be overdone and blackened.

In view of the foregoing considerations, I provide a heating element that is preferably, although not necessarily, of the electric type, and that may be either fixed or movable relatively to a material supporting means. Spring means is provided for moving either the heating element or the material-suporting means into an inoperative position, and latching means is provided to maintain the two parts in their proper operative positions relatively to each other.

I provide an hour glass which may be filled with finely divided granular material, or other suitable substances such as mercury, the hour glass being mounted on a pivotal support in such position as to effect a release of the latching means when a sufficient quantity of the material contained therein has run from the upper to the lower compartment thereof.

In the drawings,

Figure 1 is a view, in end elevation, of an electric toaster with which is associated a device embodying my invention, Fig. 2 is a view in side elevation thereof, Fig. 3 is a view, in longitudinal section thereof, of a dynamic-thrust means, Fig. 4 is a view, partially in end elevation and partially in lateral section, of a modified form of electric toaster, Fig. 5 is a view in side elevation, with certain portions cut away and others shown in section of a still further modification, and Fig. 6 is a fragmentary top plan view of the device illustrated in Fig. 5.

Referring more particularly to Figs. 1 and 2 of the drawings, I have illustrated an electric toaster 11, of the so-called turn-over type, as is more particularly disclosed and claimed in Patent No. 1,105,230, issued to S. A. Wiltsie, and a co-pending application of Ora A. Colby, Serial No. 630,271, filed April 6, 1923, and assigned to the Westinghouse Electric & Mfg. Company.

The toaster 11 comprises, in general, a base 12, a pair of spaced side members 13 and 14 and a top plate or cover portion 15. The top plate 15 may be secured against the upper end of the side plates 13 and 14 by screws or rivets 16. The bottom of the side plates 13 and 14 may be secured against the top of the base 12 by a plurality of screws 17.

An extended electric heating element 18, comprising sheets of mica 19 and 21 having mounted thereon a suitable resistor member 22, is located beneath the top plate 15 and between the side frame members 13 and 14. A rack member 23, of substantially inverted V-shape, is provided and comprises a plurality of wire members, each bent to substantially V-shape, the lower separated ends of which are secured to cross-bars 24 and 25 respectively, the ends of which are located in suitable openings in the side frames 13 and 14.

Material-supporting means comprise a plurality of flat trays 26 and 27, the lower ends of which are pivotally mounted on a cross-bar, or shaft 28, that is supported by integral extensions of the side frames 13 and 14. Operating knobs 29 and 31 are secured to the outer ends of the respective shafts 28 and are located outside of the side frames 13 and 14 to permit of the operator moving the material-supporting means.

All of the parts hereinbefore enumerated and described are substantially those disclosed and claimed in the hereinbefore mentioned application of Ora A. Colby, to which application reference may be had for further details.

A helically wound spring member 32 is provided on each of the shafts, one end of the spring being secured thereto and the other being in operative engagement with the adjacent side frame in order that each of the trays 26 and 27 may be yieldingly held in a substantially horizontal position, away from the heating element and ready for having a piece of bread placed thereon by the operator.

In this inoperative position of the respective trays, a depending portion 33 of the tray 26 engages a stop member 34, provided on the side frame, in order to limit the outward and downward turning movement of the tray under the influence of the co-operating spring 32.

Means for latching the respective trays in their proper operative positions, substantially as illustrated in Fig. 1 of the drawings, comprise an elongated latch bar 35 having a small outer overhanging catch 36 and pivotally mounted on a suitable support 37 against one of the side frames. The inner end of the latch member 35 is made relatively heavy in order to hold the latch in its proper operative position, as illustrated in Fig. 1, and is further provided with a relatively large surface 38 that is angularly disposed relatively to the length of the latch member.

Means for raising the latch member 35 comprises what may be termed an "hour glass" 39. The member 39 comprises a tube 41, (see Fig. 3 of the drawings) of a suitable material, such as glass, or metal, and which may be provided with end plugs 42 and 43. A supporting member 44 is located around the tube 41 at substantially the central portion thereof and is provided with a pivotal mounting lug 45 that is adapted to extend through the side frames, and to have mounted thereon a suitable nut, not shown, in order that the member 39 may have free turning movement on the member 45 relatively to the rest of the toaster.

An annular member 46 having an opening 47 extending therethrough, is located in the central portion of the tube 41 and divides it into two compartments. Means for adjusting the size of the opening 47 comprises a screw 48 that extends into the member 46 from the outside of the tube 41. A mass 49, of finely divided sand or other suitable material, is located within the tubular member 41 and runs from one compartment to the other when the member 39 is located in substantially the position illustrated in Figs. 1 and 2 of the drawing, which position is preferably at an angle of substantially 45° to a vertical line.

Means for properly positioning the reversible member 39 comprises a spring 51, one end of which is mounted on the adjacent side frame of the toaster. The resilient member 51 permits of a turning movement of the member 39 in a counterclockwise direction, after which it may be made to rest against the upper free end of the member 51, substantially as illustrated in Figs. 1 and 2 of the drawing.

Suitable terminal pins 52 are insulatedly mounted on one of the side frames just above the base member 12 and are electrically connected to the ends of the resistor member 22.

Referring more particularly to Fig. 4 of the drawings, I have there illustrated a modified form of electric table toaster comprising a base 53 that may be made of a hollow casting or of suitably punched and formed sheet metal. On the base 53 are mounted a pair of co-operating half casings 54 and 55, which, when located in proper operative and cooperating positions relatively to each other, form a substantially closed casing.

An extended heating element is insulatedly mounted in each of the casing portions 54 and 55 and comprise resistor members 56 and 57 that may be of any suitable or desired form, such for instance, as has already been disclosed in connection with Figs. 1 and 2 of the drawings. In Fig. 4 of the drawings, I have illustrated a heating element schematically only, as it forms no part of this particular invention.

Each of the casing portions 54 and 55 is pivotally mounted on shafts 58 and 59 respectively, suitably supported by the casing 53 at the top thereof. Spring members 61 and 62 are mounted on the shafts 58 and 59, respectively, and tend to hold the respective casing portions in their inoperative position, which, as indicated in Fig. 4 of the drawings, is at substantially right angles relatively to the casing.

Means for holding the casing portions in their normally opposed and co-operating position comprises latching levers 63 and 64 that are pivotally mounted on suitable supporting shafts 65 and 66 supported by the casing 53.

Means for holding a slice of bread above the casing 53 comprises a suitable cage 67 that may be built up of a number of wires bent to substantially the form illustrated in Fig. 4 of the drawings. A cross bar 68 may be welded, or otherwise secured, to the upper intermediate portion of the members 67, and the lower ends of the members 67 may extend through suitable openings in the upper part of the base 53, and be bent against the under surface of the top, whereby the material supporting means is securely held in its proper operative position on the base 53.

While I have stated above that the casing comprising the casing portions 54 and 55 may be totally enclosed, I have illustrated the sides thereof as being perforated in order that the progress of the toasting operation may be observed, if so desired, although this is not necessary.

A dynamic-thrust time-controlled member 39 is located in the hollow casing 53, mounted on a suitable portion thereof and a stop member 51 is provided, as was heretofore described in connection with the toaster illustrated in Figs. 1 and 2 of the drawings.

In Fig. 5 I have illustrated a still further modification comprising a hollow base 69, which I prefer to make a casting and also to make it relatively heavy for a purpose that will be hereinafter apparent.

A casing 71 is fixedly mounted on the top of the base 69 and may have its sides perforated, as shown in Fig. 5 of the drawing and have a transparent sheet of mica located therein or it may be made solid in order to provide a substantially closed casing. The top of the casing and one side thereof are provided with an intermediate opening or slot in order that a material supporting means 72 may move into and out of the casing 71. A side 71a of the casing 71 is pivotally supported on the base 69 in operative relation with the material supporting means 72.

The material supporting means 72 comprise a base plate 73 and a side and upper strip 74 suitably secured thereto and having the upper part thereof spaced therefrom, a plurality of spaced rods 75 being employed to connect the two portions and to provide, also, a cage within which a slice of bread to be toasted may be placed. As is illustrated in Fig. 5, the end rods 75 are bent inwardly in arcuate form so as to permit the operator to place a slice of bread within the material-supporting means and to remove it therefrom without touching the rods 75.

The means 72 is pivotally mounted on a shaft 76 that is supported at the upper side edge of the base 69, and a spring member 76a is mounted on the shaft 76 and tends to hold the material-supporting means 72 in an inoperative position relatively to the rest of the device, which position is at substantially 90° from that illustrated in Fig. 5.

The material supporting means 72 is provided with a depending member 77, of substantially arcuate form, and having a slot 78 therein, into which a stop member 79, mounted in the base 69 extends.

A plurality of extended heating elements 81 and 82 are located within the casing 71 adjacent to the sides thereof and may be of the type hereinbefore described in connection with Figs. 1 and 2.

A latching bar 83 is pivotally mounted on a shaft 84 in the hollow base 69 and has one end thereof formed to act as a stop member for a depending integral portion 85 of the side 71a of the casing 71. Its other end is made relatively heavy and formed with an arcuate end 86 which is adapted to be engaged by a pivotally mounted dynamic-thrust means 39. A resilient stop member 51 is provided in order that the means 39 may be properly positioned relatively to the latching bar 83.

Referring more particularly to the form of device embodying my invention as illustrated in Figs. 1 and 2 of the drawing, I have illustrated separate dynamic-thrust releasing means 39 for each of the trays 26 and 27, in order that they may be moved independently of each other. This is not necessary, as by suitable interconnection of the two trays one releasing means 39 would effect the release of both trays and permit them to swing outwardly by reason of the action of the springs 32.

In order to operate the device, the latching levers 35 may be tripped by hand or they may be tripped by giving the time-controlled means 39 a quick turning movement so that the upper end portion thereof will engage the surface 38 of the end of the latch bar. This will permit the trays 26 and 27 to move to such position as will permit the operator to place a piece of bread thereon, from which position he may move them back to the position illustrated in Fig. 1 of the drawing, by means of the knob 31 operatively associated therewith. As the sand or other comminuted material within the member 39 has run into the lower part of the member, the operator turns the member 39 in a counterclockwise direction, as illustrated by the arrow of the drawings, until it occupies substantially the position illustrated in Fig. 1.

The member 51 permits of this turning movement, and also permits of the operator turning the member 39 slightly backward in order to properly locate the same. The material 49 then flows through the opening 47 into the lower part of the tubular member 41 and when a sufficient quantity has run into the lower part of the member 39 it will turn on its pivotal mounting 35. The upper end thereof will engage the surface 38 at the outer end of the latching lever 35, and as the member 39 turns through a certain angular distance before it operatively engages the lever 35, it will be moving when it strikes the surface 38, and therefore provides what I term a dynamic-thrust means for releasing the latching means provided by the lever 35. This permits of making all of the parts relatively light and still obtain the necessary action of the releasing mechanism.

It is obvious that any desired time of operation of the releasing mechanism may be obtained by adjustment of the screw 48 to vary the size of the opening 47 within the member 46. This permits of adjusting the time of operation of the device and the kind of toast desired and also to the initial dryness of the slices of bread that are to be toasted.

The relative positions of the member 39 and of the latching member are such that the member 39 is permitted to move to substantially a vertical position (not shown), its upper end thereof moving beyond the engaging end of the latching lever 35, which is, of course, raised out of the way during the turning movement of the member 39. In order to again employ the device 39, it is necessary only to turn it in a counterclockwise direction to substantially the position illustrated in Fig. 1.

In the type of toasters illustrated in Figs. 1 and 2 of the drawings, the slice of bread has its position automatically reversed relatively to the tray, as the tray swings outwardly and downwardly away from the heating element, as is more particularly explained and claimed in patent No. 1,105,230. It is only necessary for the operator to turn the tray upwardly by means of a knob 31 in order to have an untoasted surface of the slice of bread located adjacent to the heating element, whereby the toasting operation on the slice of bread will be completed.

Referring more particularly to the modified form of toaster illustrated in Fig. 4 of the drawings, the slice of bread placed within the material holding means 67 remains in substantially stationary position and the two heating elements located in the respective casing portions are moved away from their normal operative closed position relative to the slice of bread. In this form of toaster, both sides of a slice of bread are toasted simultaneously. It is to be noted, however, that I do not interrupt the supply of energy to the heating elements 56 and 57 when they are in their inoperative positions.

As illustrated in Fig. 4 of the drawings, the latching bars 63 and 64 hold the respective casing portions 54 and 55 in their normal operative and opposed positions by means of integral depending lugs and the inner ends of the respective bars 63 and 64 are located in substantially co-extensive overlapping and opposed positions relatively to each other. This permits of employing a single time-controlled dynamic-thrust releasing means 39 to effect the release of both latching bars simultaneously, whereby the two casing portions 54 and 55 will move outwardly and away from each other simultaneously.

A suitable stop means may be provided for each of the latching bars 63 and 64 in order that they may always occupy proper positions relatively to the releasing means 39. The action of the releasing means 39 is substantially that hereinbefore recited in connection with the device illustrated in Figs. 1 and 2.

The action of the releasing means 39 in the device illustrated in Fig. 5 of the drawings, is substantially the same as is hereinbefore described in connection with the other modifications. When the member 39 strikes the curved surface of the latching bar 83, it will move that end upwardly and disengage the other from the depending portion 85 and permit the spring 76a to cause a turning movement of the material holding means 72 on the pivotal mounting means 76 until it has been turned outwardly through substantially 90°. In this position, the operator may remove the toasted slice of bread and insert an untoasted slice after which the material supporting means may be returned to its normal operating position.

A knob 87 operatively engages the side 71a and on the material supporting means 72 and may be of heat-insulating material to permit of manually moving the means 72 from its inoperative to its normal operative position.

My invention thus provides a toaster, particularly of the table type, that has associated therewith dynamic-thrust adjustable time-controlled means for effecting relative changes of positions of the heating element and of the material-supporting means comprising the toaster without interrupting the supply of energy to the heating element.

While I have illustrated my invention as associated with a table type of toaster heated by electric heating elements, it is evident that it is not limited thereto, as suitably designed gas heating elements might also be employed therewith.

Various modifications and changes may be made without departing from the spirit and scope of the invention I desired, therefore, that only such limitations shall be placed thereon as are imposed by the prior art.

I claim as my invention:

1. In an electric toaster having a frame including a pair of side members, a heating element therebetween, a pivotally supported tray, spring means tending to turn the tray away from the heating element, and a latch for holding the tray adjacent to the heating element, an hour glass member mounted on one of said side members for turning movement thereon for striking the latch to effect its release, and a leaf spring for positioning the hour glass member preparatory to striking said latch.

2. In an electric toaster having a frame including a pair of side members, a heating element therebetween, a pivotally supported tray, spring means tending to turn the tray away from the heating element, and a latch for holding the tray adjacent to the heating element, an hour glass member mounted on one of said side members for turning movement thereon in a predetermined direction to strike said latch to effect its release, and resilient means for preventing a turning movement of the hour glass member in the opposite direction.

In testimony whereof, I have hereunto subscribed my name this 7th day of February, 1924.

HARRY R. VAN DEVENTER.